Oct. 2, 1956
J. J. CHAPEL ET AL
2,765,390
ELECTRIC SOLDERING TOOL
Filed April 24, 1951
2 Sheets-Sheet 1
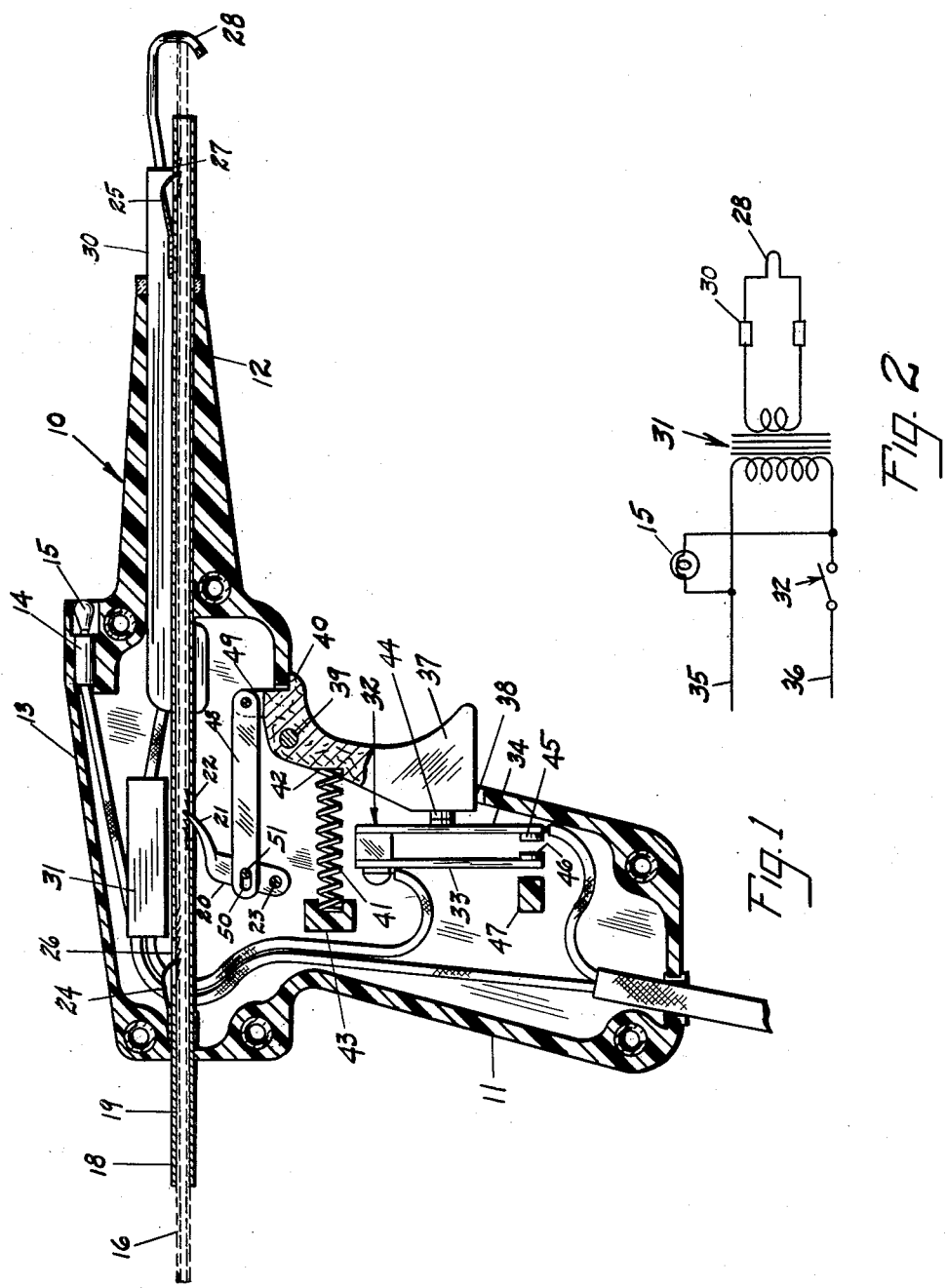
INVENTOR.
JOHN J. CHAPEL
BY JAMES H. McGAUGHEY
Corbett, Mahoney & Miller
ATTYS.

Oct. 2, 1956 J. J. CHAPEL ET AL 2,765,390
ELECTRIC SOLDERING TOOL
Filed April 24, 1951 2 Sheets-Sheet 2

INVENTORS
JOHN J. CHAPEL
JAMES H. MC GAUGHEY
BY Corbett, Mahoney & Miller
ATTORNEYS United States Patent Office 2,765,390
Patented Oct. 2, 1956

2,765,390

ELECTRIC SOLDERING TOOL

John J. Chapel, Columbus, Ohio, and James H. McGaughey, Erie, Pa.

Application April 24, 1951, Serial No. 222,672

4 Claims. (Cl. 219—27)

Our invention relates to an electric soldering tool. It has to do, more particularly, with an electric soldering tool of the manually-fed pistol type wherein the heating element and the feed of the solder, in the form of a strip, is controlled by a trigger.

Many soldering tools of this general type have been provided in the past. One difficulty with prior art tools has been in keeping the soldering tip or point clean due to the shape thereof and especially if made of carbon. Another disadvantage has been due to the fact that with a pointed tip, the joining of two parts is difficult since it requires considerable skill to hold the parts together with one hand and manipulate the tool to drop the solder on the contacting parts. Also, with prior art tools the feed of the solder strip is not positive and there is a tendency for the solder to reverse its feed when released by the trigger. Furthermore, the prior art tools have been so designed that the heating element is on constantly or is only turned on when the solder is fed. With the former arrangement, considerable waste of current occurs and with the latter, there is no way of heating the tool without feeding solder which is sometimes desirable.

One of the objects of our invention is to provide a soldering tool of the pistol type which is of simple construction and wherein the heating element and the feed of a strip of solder are controlled automatically by a trigger, movement of the trigger serving to first complete the circuit to the heating element and further movement of the trigger serving to feed the solder.

Another object of our invention is to provide a soldering tool of the type indicated wherein the forward feed of the solder strip is positive and there is no possibility of the solder strip feeding rearwardly when the trigger is released.

A further object of our invention is to provide a soldering tool of the type indicated which has a soldering shoe so shaped that it will have maximum soldering contact with the work, will be self-cleaning, and will facilitate gripping and holding of parts together for soldering and application of the solder thereto.

Another object of our invention is to provide a soldering tool which is so designed that the soldering element can be removed and be replaced readily.

Various other objects will be apparent.

The preferred embodiment of our invention is illustrated in the accompanying drawings wherein similar characters of reference designate corresponding parts and wherein:

Figure 1 is a longitudinal sectional view taken through the soldering tool of our invention.

Figure 2 is a diagram of the electric circuit of the tool.

Figure 3:
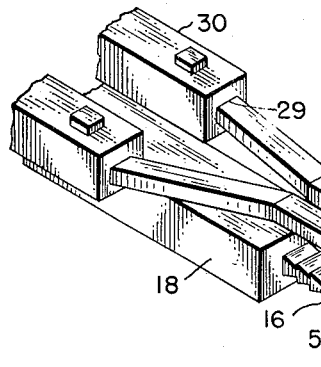
Figures 3 to 6 are isometric views of different types of soldering elements which we may use for engaging the work.

With reference to the drawings, we have illustrated our tool (Figure 1) as comprising a pistol type body which may be moulded of plastic or formed of other suitable material. The body is preferably made of two separable half sections 10, only one being shown. Each body section is provided with the handle portion 11 and the forwardly projecting portion 12. On the top of each body an extension 13 is formed which has an open forward end and which provides a socket 14 in which a light bulb 15 is provided, the light beam produced thereby being directed forwardly onto the work.

Figure 8:
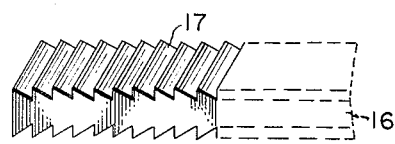
Fig. 8 is an isometric view of a solder form used in the tool.

The solder 16 for use in our tool is preferably in strip or wire form of square cross-section having serrations 17 on both its top and bottom surfaces, as shown in Figure 8.

For supporting the solder strip 16 slidably within the tool, a hollow guide member 18, preferably of metal, is either molded or otherwise secured in one of the half-sections 10 of the body. The solder strip 16 will snugly fit for sliding movement in the passage 19 extending through this member 18. It will be noted that this member 18 projects from each end of the body section 10.

For advancing the solder strip 16 through guide member 18, a pawl 20 is provided and has a sharp finger 21 for engaging the serrations 17 on the lower surface of the solder strip, projecting upwardly through a longitudinal slot 22 in the wall of guide member 18. Pawl 20 is pivoted to the body section 10 at the point 23 at its lower end and when swung forwardly about the pivot, the finger 21 engages the solder and moves it forwardly in guide passage 19 until the pawl swings down off the serration which it has been engaging. To prevent rear feed of the solder in guide passage 19, locking spring dogs 24 and 25 are provided which are fastened to member 18. The spring dog 24 is located at the rear just within the body section 10 and its free forward end extends downwardly through a longitudinal slot 26, in the upper side of member 18, into engagement with the serrations 17 on the top surface of the strip 16. The spring dog 25 is located just within the forward end of the body section 10 and its free forward end projects downwardly through a longitudinal slot 27 in the upper side of member 18 into engagement with the top surface of the solder strip 16. When only one strip of solder is in guide 18, both dogs 24 and 25 prevent rearward movement of the strip. By having two dogs, however, one piece of solder may be ahead of finger 21 and another behind it and pushing it, the dog 25 engaging the forward piece and the dog 24 engaging the rearward piece and both pieces being thus prevented from rearward movement.

The solder is fed forwardly into association with a soldering element 28 which is of a form to be described in detail hereinafter. This soldering element is mainly of U form and its two legs are removably secured in sockets 29 (Figure 3) formed in the outer ends of a pair of electrodes 30. These electrodes 30 are molded or otherwise mounted in the housing sections 10, one being shown so mounted in Figure 1. It will be noted that sockets 29 are square and the cross-section of the soldering element 28 is also square, it being understood that the element 28 and the electrodes are made from good conducting material, such as copper or brass. A transformer 31 may be mounted within one of the sections 10 and a switch 32 is disposed in the handle portion 11 thereof. This switch embodies spring contacts 33 and 34 which are normally spaced.

The circuit arrangement is shown in Figure 2. The main lines 35 and 36 lead from a suitable power connection into the handle of the tool. The switch 32 is in the line 36. Connected across lines 35 and 36, beyond switch 32, is the bulb 15. The lines 35 and 36 connect to the primary of transformer 31, its secondary being connected to the electrodes 30 which connect to element 28.

For operating switch 32 and pawl 20, the trigger 37 is provided, projecting through a vertical slot 38 at the rear side of handle portion 11. This trigger is pivoted to the portion 11 at 39, adjacent its upper edge, a stop 40 being provided on the trigger to limit forward swinging movement created by compression spring 41 which has its forward end in a socket 42 in the trigger and its rear end in a socket formed in a lug 43 on the handle portion. The lower and inner edge of the trigger is provided with a lug 44 which engages switch spring 34 and will force it inwardly when trigger 37 is pressed sufficiently, causing point 45 on spring 34 to engage point 46 on spring 33, inward movement of spring 33 being limited by stop lug 47 on the interior of handle portion 11.

The trigger 37 also operates pawl 20, being connected thereto by a link 48 which has its forward end pivoted to an upstanding lug 49 on the upper end of trigger 37 and having a slot 50 in its rear end which receives a pin 51 on the pawl 20. The pin and slot connection permits the trigger 37 to first operate switch 32 and upon continued movement to then swing the pawl 20 forwardly to move the solder forwardly. Thus, the circuit to element 28 will first be completed and then the solder strip 16 will be moved forwardly. Consequently, the tool may be heated without feeding solder. Each time the circuit is closed, bulb 15 is lit.

Figure 7:
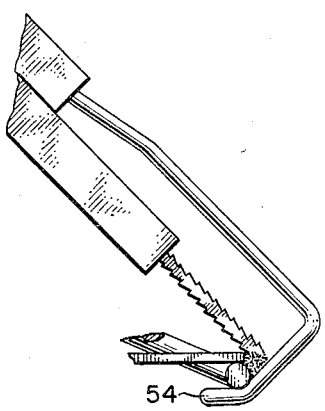
Figure 7 is a side elevational view of the forward portion of the tool showing how the soldering element engages the work.

The preferred shape of the element 28 is shown in Figure 3. It is mainly of U-form with its forward or closed end bent downwardly at 52 and then rearwardly at 53. There is thus provided a saddle portion, which has a work-contact shoe 54, at a proper level over and through which the forward end of the solder strip 16 will extend, it being obvious that the lower part of the saddle will be below the level of guide member 18. Thus, the tip of the solder will be heated and will drop onto the saddle. Because of the hook-shaped end, the saddle 54 can be positioned under the parts to be united, as shown in Figure 7. Also, the shoe could be positioned over the parts if desired.

Figure 4:
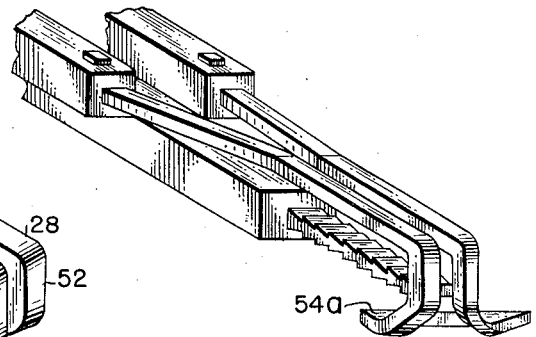
Figure 5:
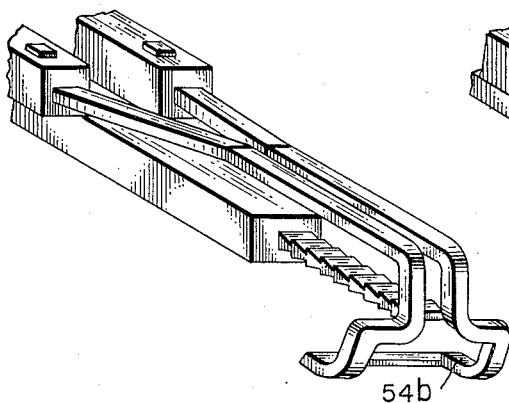
Figure 6:
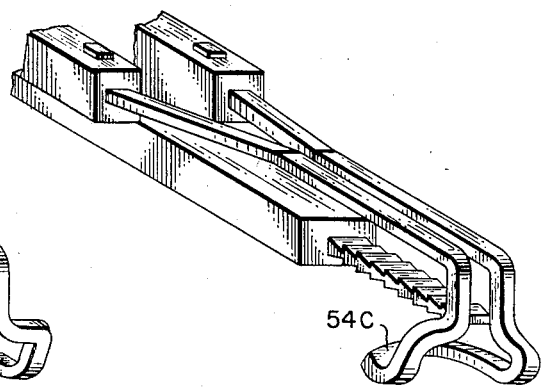

The shape of the saddle may be varied, as shown in Figure 4, to provide the elongated horizontal shoe 54a, or as shown in Figures 5 and 6, to provide the elongated horizontal shoes 54b and 54c, respectively. In each case, the soldering element is hook-shaped and has a work-contacting shoe formed thereon. The soldering shoe is designed to offer maximum soldering contact with the work. The hook design allows gripping of the work and the shoe holds sufficient solder effectively in the form of a drop until contacted with the work. Instead of hooking beneath the work, the shoe can contact the top of the work and the solder will run off the shoe onto the work. Continued heating of the element after the work is finished will cause all the solder to drop therefrom, if the forward feed of the strip is not continued. Thus, the soldering element will be self-cleaning. As pointed out previously, the heat may be on without feeding the solder merely by pressing the trigger slightly. Thus, in the initial use of the tool, the element 28 may be heated before the solder is moved into association therewith. Furthermore, as indicated above, the feed of the solder may be stopped and the element be still heated to remove solder therefrom after the work is finished. Each time the tool is laid down the trigger is automatically returned by spring 41 to shut off the current.

It will be apparent that we have provided a soldering tool having many advantages, many of which have been discussed and others of which will be apparent.

Having thus described our invention, what we claim is:

1. A soldering tool comprising a handle, a soldering element supported on the handle, electric means carried by the handle and connected to the element for heating it, a switch carried by the handle and having normally spaced contacts connected to said heating means, means on the handle for supporting and feeding a strip of solder to said soldering element, a control element for controlling said switch and said solder-feeding means, said control element comprising a trigger carried by the handle, means for operating the switch to close its contacts upon initial movement of the trigger, and a lost-motion connection between said trigger and said solder-feeding means to permit the initial movement of the trigger without affecting said feeding means but to actuate said feeding means upon the continued movement of said trigger.

2. A soldering element according to claim 1 wherein the soldering element projects from the handle and is in the form of a U-shaped member having its end bent downwardly and rearwardly to form a soldering shoe, said solder-feeding means supporting the strip of solder for feeding its end outwardly directly over said soldering shoe.

3. A soldering tool comprising a body with a handle, a guide member on said body for supporting a strip of solder for sliding forward movement, a soldering element supported by electrodes carried by the body and projecting forwardly from the body and having a forward end of U-shape bent downwardly and rearwardly to form a solder-receiving shoe, a switch carried by said body and having normally spaced contacts connected in an electric circuit with said electrodes, means for engaging the solder and feeding it forwardly from said guide member over said shoe, said means including a movable pawl projecting through said guide member and engaging the solder strip, a movable trigger for operating said pawl and said switch, said trigger having a portion which engages one of said switch contacts upon its initial movement to force the contacts together, and a lost-motion connection between the trigger and said pawl to permit the initial movement of the trigger without affecting said pawl but to actuate said pawl upon the continued movement of said trigger.

4. A tool according to claim 3 wherein the strip of solder is of square cross-section with serrated upper and lower surfaces so that the pawl will engage one of the serrated surfaces, and dogs projecting through said guide and engaging the other of said surfaces to prevent reverse movement thereof in said guide.

References Cited in the file of this patent

UNITED STATES PATENTS

| | | |
|---|---|---|
| 2,251,557 | Weston | Aug. 5, 1941 |
| 2,396,799 | McCully | Mar. 19, 1946 |
| 2,501,192 | Scholler | Mar. 21, 1950 |

FOREIGN PATENTS

| | | |
|---|---|---|
| 481,669 | Great Britain | Mar. 15, 1938 |
| 494,419 | Great Britain | Oct. 21, 1938 |

OTHER REFERENCES

The Betz Company Line for 1927, Frank Betz Co., Hammond, Indiana, page 104.